US011327179B2

(12) United States Patent
McKeown et al.

(10) Patent No.: US 11,327,179 B2
(45) Date of Patent: May 10, 2022

(54) METHOD AND SYSTEM FOR TRACKING, PROCESSING, AND INTEGRATING AIRPORT GROUND VEHICLE POSITION DATA INTO THE AUTOMATIC DEPENDENT SURVEILLANCE-BROADCAST (ADS-B) NETWORK INFRASTRUCTURE

(71) Applicant: Eagle Aerospace Ltd., Campbellford (CA)

(72) Inventors: Stephen Lyle McKeown, Campbellford (CA); Rick Thibodeau, Campbellford (CA); Paul Edward Cudmore, Castleton (CA); Ty Shattuck, Burlington (CA)

(73) Assignee: EAGLE AEROSPACE LTD, Campbellford (CA)

( * ) Notice: Subject to any disclaimer, the term of this patent is extended or adjusted under 35 U.S.C. 154(b) by 233 days.

(21) Appl. No.: 16/150,319

(22) Filed: Oct. 3, 2018

(65) Prior Publication Data

US 2019/0101650 A1 Apr. 4, 2019

Related U.S. Application Data

(60) Provisional application No. 62/567,268, filed on Oct. 3, 2017.

(51) Int. Cl.
*G01S 19/03* (2010.01)
*G08G 7/00* (2006.01)
(Continued)

(52) U.S. Cl.
CPC ............ *G01S 19/03* (2013.01); *G01S 5/0027* (2013.01); *G01S 19/14* (2013.01); *G08G 5/0013* (2013.01);
(Continued)

(58) Field of Classification Search
CPC ........ G01S 5/0027; G01S 19/03; G01S 19/14; G08G 5/0013; G08G 5/0026; G08G 5/0082; G08G 7/00; H04W 84/06
See application file for complete search history.

(56) References Cited

U.S. PATENT DOCUMENTS 9,275,550 B1 3/2016 Stefani et al.
10,302,759 B1 * 5/2019 Arteaga ............... G08G 5/0082
(Continued)

FOREIGN PATENT DOCUMENTS

EP 3 285 246 A1 2/2018

OTHER PUBLICATIONS

International Search Report and Written Opinion for corresponding International Application No. PCT/CA2018/051246 dated Jan. 10, 2019.

(Continued)

*Primary Examiner* — Dao L Phan
(74) *Attorney, Agent, or Firm* — Pearne & Gordon LLP

(57) ABSTRACT

A method and system for tracking the real-time positions of airport ground vehicles, and integrating the positional data into the Automatic Dependent Surveillance-Broadcast (ADS-B) network infrastructure. The system may include one or more ground receiver stations that receives positional telemetry data from one or more airport ground vehicles, and transmits the ground vehicle positional data to a centralized ground base station. A computer system connected to the ground base aggregates the ground vehicle telemetry data from one or more ground vehicles, converts the aggregate telemetry data into an ADS-B compatible data protocol, and integrates that data into the ADS-B network infrastructure for dissemination and reporting across the ADS-B network. The method enables the use of and dissemination of ADS-B (Continued)

information for ground vehicles without the need for ADS-B transponders on each ground vehicle.

10 Claims, 2 Drawing Sheets

(51) Int. Cl.
    *G01S 19/14*     (2010.01)
    *G08G 5/00*     (2006.01)
    *G01S 5/00*     (2006.01)
    *H04W 84/06*     (2009.01)

(52) U.S. Cl.
    CPC ......... *G08G 5/0026* (2013.01); *G08G 5/0082* (2013.01); *G08G 7/00* (2013.01); *H04W 84/06* (2013.01)

(56) References Cited

U.S. PATENT DOCUMENTS

| | | |
|---|---|---|
| 2002/0021247 A1 | 2/2002 | Smith et al. |
| 2010/0090891 A1 | 4/2010 | Donovan |
| 2014/0163857 A1 | 6/2014 | Melum et al. |

OTHER PUBLICATIONS

FAA: "Vehicle Automatic Dependent Surveillance-Broadcast (ADS-B)", U.S. Department of Transportation, Federal Aviation Administration, Surveillance and Broadcast Services Program, FAA-E-3032, Rev.-,NCP 35882/JM232-SBS-1004, Jan. 7, 2015, pp. 1-39.
FAA: Advisory Circular, Subject:"Ground Vehicle Automatic Dependent Surveillance-Broadcast (ADS-B) Out Squitter Equipment", U.S. Department of Transportation, Federal Aviation Administration, 150/5220-26, Change: 2, Nov. 4, 2016, pp. 1-16, Retrieved from URL: https://www.faa.gov/documentLibrary/media/Advisory_Circular/150-5220-26-consolidated-chg2.pdf.
Extended European Search Report dated May 28, 2021 for Corresponding European Application No. 18865258.0.
Federal Aviation Administration: "System Specification Ground-Based Transceiver (GBT) For Broadcast Services Using the Universal Access Transceiver (UAT) Data Link", Jan. 15, 2004, pp. 1-37, XP055805032; Retrieved from the Internet on May 17, 2021: URL https://www.faa.gov/nextgen/programs/adsb/Archival/media/Baseline%20GBT%20Specification.pdf.

\* cited by examiner

METHOD AND SYSTEM FOR TRACKING, PROCESSING, AND INTEGRATING AIRPORT GROUND VEHICLE POSITION DATA INTO THE AUTOMATIC DEPENDENT SURVEILLANCE-BROADCAST (ADS-B) NETWORK INFRASTRUCTURE

FIELD

This invention relates to a ground vehicle tracking and reporting system, and in particular to airport surface management, that is compatible with and integrates with Automatic Dependent Surveillance-Broadcast (ADS-B) network.

BACKGROUND

Airports are complex operating environments with vehicular traffic comprised of aircraft, and the ground vehicles (e.g., service, food, passenger, luggage, etc.) necessary to support and service the airport and aircraft. Every year, there are incidents and accidents involving aircraft and vehicles at airports that have potentially serious consequences. For example, runway incursions are incidents where an unauthorized aircraft, vehicle, or person is on a portion of the airport designated as a movement area (e.g. runway, taxiway). This presence creates a safety risk that an airplane taking off or landing will collide with the object. Many of these events occur in periods of reduced visibility (e.g. fog), which can result in a loss of situational awareness for flight crews, air traffic controllers and support personnel working on the airfield.

Additionally, it is important that different service departments that operate within the airport (e.g. baggage handlers, security, maintenance, ground crews) are able to track the movement of and locate their vehicles. Fleet management can include a range of functions, such as vehicle maintenance, vehicle telematics (e.g. diagnostics, tracking), driver management, fuel management, and health & safety management. Proper fleet management can minimize the risks associated with vehicle investment, improve productivity and efficiency, and ensure the safety of the vehicle and other assets near the vehicle.

For at least the above reasons, it is important to be able to track the locations of vehicles, airplanes, and other assets at an airport. Historically, Surface Movement Radar (SMR) has been used to try and track these locations. SMR detects aircraft and ground vehicles on the surface of an airport. SMR uses a rotating antenna, often mounted on an airport tower, to scan the area of the airport within range of the antenna. When SMR senses an object the SMR returns a return pulse or 'blip' that identifies the location of an object(s) on the airport surface, but the return pulse is insufficient to identify the object by type, name, function, or intention. For example, SMR can identify that there is "an" object on the airport surface, but provides insufficient detail to determine if the object is an aircraft or a ground vehicle, much less if it is supposed to be there or not. SMR is therefore typically augmented by visual observation or other data sources and can be overlaid on a map view of the airport to provide context and meaning to the SMR 'blip.'

One type of additional data source is an Automatic Dependent Surveillance-Broadcast (ADS-B) system. The ADS-B system is a surveillance system where an aircraft or ground vehicle determines its own position via navigation technology and periodically broadcasts it. The ADS-B system is "automatic" because it does not rely on a pilot or external output to broadcast or determine its position. The ADS-B system is "dependent" on the aircraft's navigation technology. This navigation technology can include radio navigation or GPS navigation techniques. This information is used to inform other aircraft and ground stations about location, speed (both horizontally and vertically), and intention.

The ADS-B system generally comprises three main components: ground infrastructure, a transmitting structure, and operating procedures. The ground infrastructure can comprise ADS-B antennas on the ground, a network infrastructure to transmit received messages to relevant air traffic controllers (ATC), and systems to fuse the surveillance data from ADS-B with surveillance data from existing RADAR infrastructure. The ground infrastructure can include further structural units and/or programming to transmit and receive surveillance data as necessary. The transmitting structure functions at the source (e.g. a vehicle or aircraft, and includes message generation and transmission functions). The transmitting structure can comprise a dedicated 978 MHz universal access transceiver (UAT), a 1090 MHz Mode S "extended squitter" transponder paired with a GPS navigation source, or any structure that functions as necessary. An ADS-B datalink supports a number of airborne and ground applications. Each application has its own operational concepts, algorithms, procedures, standards, and user training.

For example, an aircraft with an "ADS-B Out" transmitter periodically broadcasts information about the aircraft, such as identification, its position in space, air speed, altitude, and air-maneuver information via the datalink. An "ADS-B In" receiver receives and interprets ADS-B data on a computer screen. "ADS-B In" receivers can be integrated into the air traffic control system or installed aboard other aircraft to provide an accurate depiction of real-time aviation traffic, both in the air and on the ground.

ADS-B is becoming one of the most important technologies for air transportation, but the technology was originally designed for aircraft, and, although it can now also be used in many ground vehicles it does not, on a standalone basis, efficiently solve the location tracking challenges associated with airport ground vehicles and mobile equipment.

To improve the efficiency and effectiveness of airport surface movement management, it is desirable to have ADS-B tracking data for airport ground vehicles and mobile equipment. However, it is cost prohibitive to install individual ADS-B transponders on tens, and in larger airports hundreds, of ground vehicles and assets for which ADS-B was not designed. Additionally, as noted by the Federal Aviation Administration (FAA), Airport Surface Detection Equipment-Model X (ASDE-X) and Airport Surface Surveillance Capacity (ASSC) are needed to receive the ADS-B squitter signals from the ground vehicles for use on ATC displays. A limited number of airports have been outfitted with these capabilities.

The present invention provides a method and system for tracking airport ground vehicles and equipment that can be integrated with the ADS-B ground infrastructure for reporting purposes. The present invention may be beneficial because it does not require installing individual ADS-B transponders on the ground vehicles/assets themselves.

SUMMARY

In accordance with one aspect of the present invention, there is provided a method for tracking, processing and integrating data from a plurality of vehicles in an airport environment. The method including steps of: collecting data from the plurality of vehicles, wherein the data includes positional data of each of the plurality of vehicles; combining the data from each of the plurality of vehicles into a combined data stream having an ADS-B data format; and transmitting the combined data stream to an ADS-B network.

DETAILED DESCRIPTION

Figure 1:
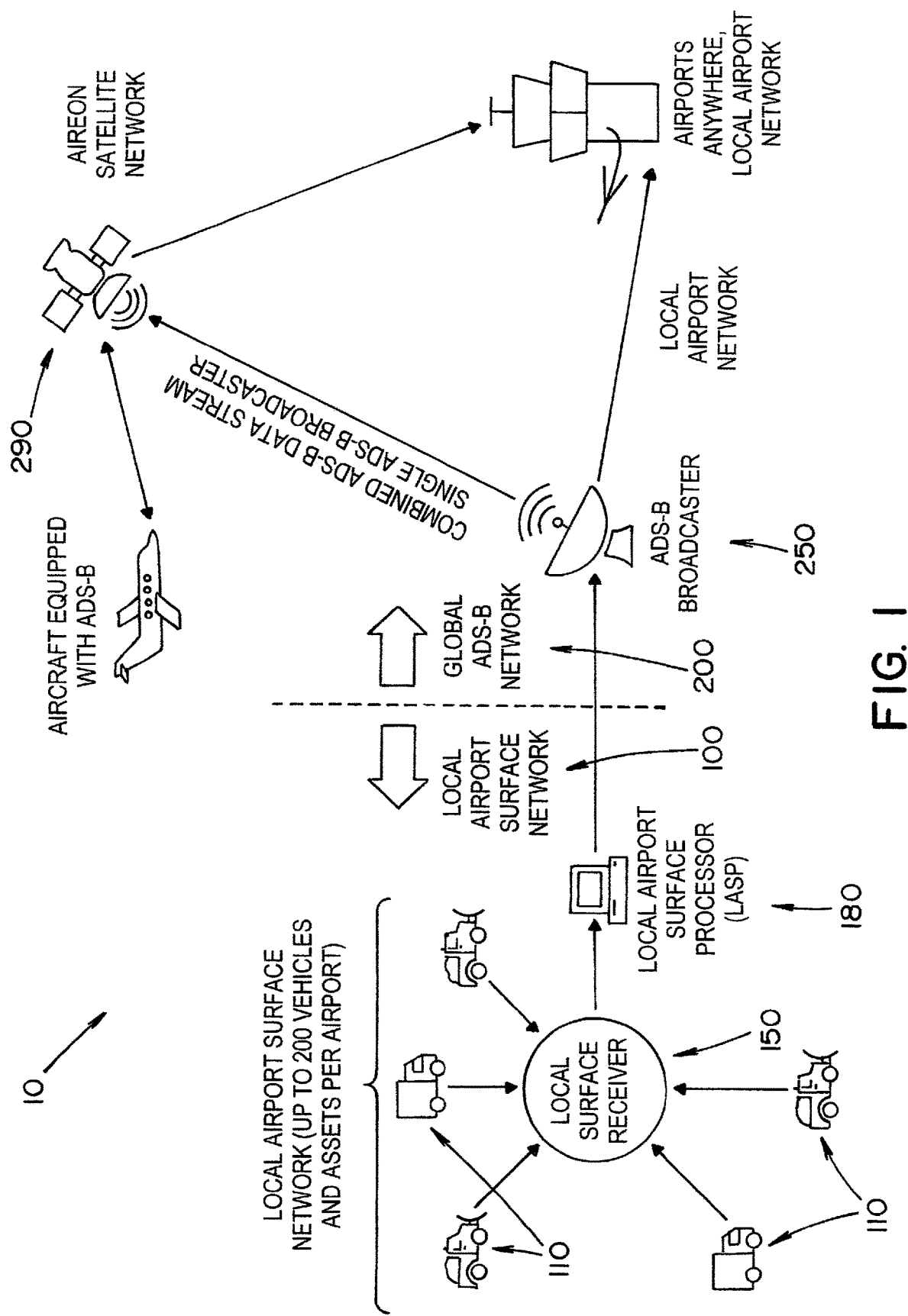
FIG. 1 shows an embodiment of a portions of system according to the present invention.

The method and system disclosed herein determines the identity of, tracks, and transmits the location of individual airport ground vehicles and assets. The method and system 10 includes a link between a Local Airport Surface Network 100 and a Global ADS-B Network 200. The Local Airport Surface Network 100 can comprise tracked assets or vehicles 110 via a base receiver 150 further described below. The Global ADS-B Network 200 can comprise an ADS-B satellite network and an ADS-B ground-based telecommunications network further described below. See FIG. 1.

The system 10 can use any number of the commercially available tracking solutions available on the market or can rely on any type of specially designed trackers. In one embodiment, a so-called "Here I Am" tracking method or system is used where a tracking unit continually tracks its own location, creates a "here I am" ping, and transmits the ping to the base receiver 150. The tracking system is so-called "Here I Am" because it is the tracking unit itself that creates the ping that is sent to the base receiver 150. In one version, a GPS-based tracking unit mounted in a vehicle 110 is used. In another version, a tracking program or service on a cell phone or other cellular-equipped device is used. In a further version, specially designed GPS-enabled devices are used. Any type of tracking unit can be implemented with the present method as long as these units continually track and transmit the location of the asset or vehicle 110 to the base receiver 150. The location can be transmitted to the base receiver 150 via a cellular network, Wi-Fi network, or other suitable network methods.

In another embodiment, an off-vehicle technology or tracking method, e.g., a so-called "There You Are" tracking method or system is used where the assets or vehicles 110 are "tagged" by an external source and a scanning device is used to sense the presence of and locate a "tagged" asset. The tracking system is so-called "There You Are" because a separate sensor determines the location of the "tagged" asset or vehicle 110, creates a "there you are" location ping, and sends the location ping to the base receiver 150. In one version, a Radio Frequency Identification (RFID) tag is used to "tag" the asset or vehicle 110. The RFID tagged asset or vehicle 110 cannot transmit its own location, but when a GPS-enabled device comes within range of the RFID tagged asset or vehicle 110, the GPS-enabled device approximates the location of the RFID tagged device and transmits the location to the base receiver 150. The location can be transmitted to the base receiver 150 via a cellular network, Wi-Fi network, or other suitable network methods. RFID also includes identification systems with active radio frequency (RF) transmitters. In particular, RFID is not limited to close-range, passive applications, but can be used (with active, powered RF transceivers) for identification over long ranges, on the range of ones or tens of miles or kilometers. Using one or more triangulation technologies, the assets or vehicles 110, such as ground vehicles in an airport, determine their own approximate or exact locations. For example, the locations of the assets or vehicles 110 may be determined within an accuracy of various ranges, such as for example, ten meters, three meters, one meter, or ten centimeters.

The above two examples are presented to illustrate the concept. It is contemplated that any "Here I Am" tracking method, "There You Are" tracking method, or other suitable location tracking methods may be integrated into the present system 10.

Whether the location of the assets or vehicles 110 are determined using the "Here I Am" method, the "There You Are" method, or any other suitable tracking method the method and system disclosed herein involves each asset or vehicle 110 on an airport surface individually transmitting its information to the base receiver 150 using an on-vehicle communication system such as radio, cell, wi-fi or other communication. In one embodiment the base receiver 150 is known as a Local Surface Receiver (LSR). This information can include, for example: the vehicle's location, the vehicle's identification tag, the current operator of the vehicle 110, the current diagnostics of the vehicle 110, and/or other desired information. The base receiver 150 is configured to collect and locally store this information. In one embodiment, a single base receiver is used for the airport. In another embodiment, multiple base receivers 150 are situated throughout the airport. A single base receiver 150 can be used in situations where the airport is smaller and more centralized whereas multiple base receivers 150 may be used in larger airports. In another embodiment, a separate base receiver 150 is used for each type of tracked asset or vehicle 110 throughout the airport. Any number of base receivers 150 and locations of the base receivers 150 is contemplated. The base receivers 150 may be installed at a fixed or movable location at or near the airport but is in any case within range of the communication systems of the assets or vehicles 110.

A data processor 180 is connected to the base receiver 150. In one embodiment, the data processor 180 is a computer identified herein as a Local Airport Surface Processor (LASP). The data processor 180 can be connected to the base receiver 150 via a cable network, a cellular network, a Wi-Fi network, and/or any other suitable connection means. In one embodiment, a single data processor 180 is connected to a single base receiver. 150 In another embodiment, a single data processor 180 is connected to multiple base receivers 150. In a yet further embodiment, multiple data processors 180 are connected to a single base receiver 150. Any configuration of a base receiver 150 and a data processor 180 consistent with the desired use is contemplated.

The data processor 180 is configured to collect at least a portion of the individual vehicle information from the base receiver 150. In one embodiment, the data processor 180 only collects the location information in the base receiver 150 for each individual asset or vehicle 110. In another embodiment, the data processor 180 collects all the information in the base receiver 150 for each individual asset or vehicle 110. Any amount of information consistent with the desired use is contemplated.

Figure 2:
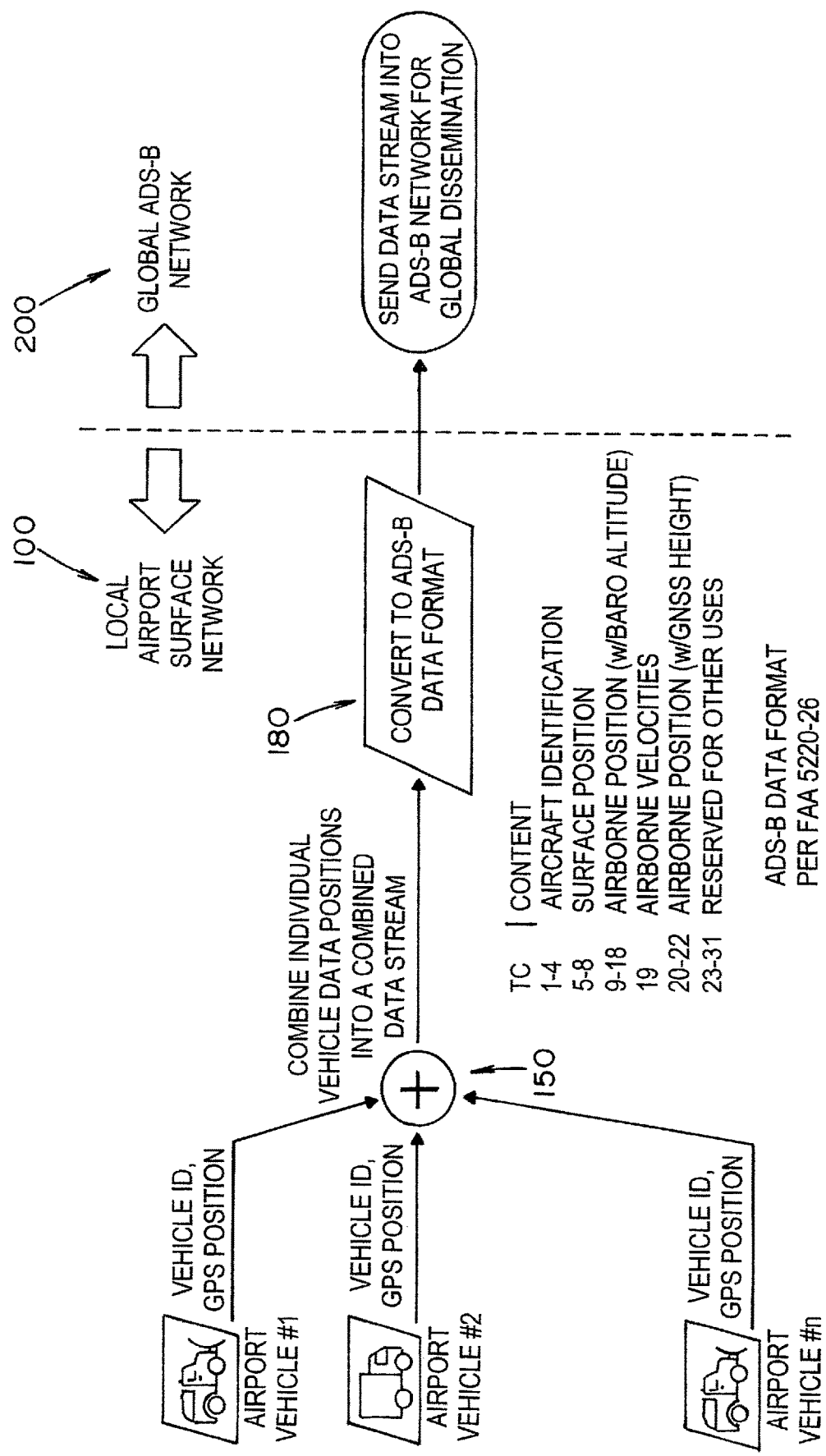
FIG. 2 shows an embodiment of portions of a method according to the present invention.

Referring to FIG. 2, in one embodiment, the data processor 180 may combine the individual vehicle information, from multiple assets or vehicles 110, into a single combined data stream. Any suitable method or means of combining the individual data points is contemplated. The data processor 180 then converts the combined data stream into a single ADS-B compatible data protocol. In another embodiment, each one of the separate pieces of the individual vehicle information is converted into a separate data packet having a compatible ADS-B data protocol. Once all the separate pieces or data packets are converted into ADS-B data format, the separate pieces or data packets may be combined into a single combined ADS-B data stream. Any means and method of combining and converting the individual vehicle information is contemplated.

Within the boundaries of the established protocol, an ADS-B message can be 112 bits long and consist of five parts. The five parts comprise: a downlink format; capability; International Civil Aviation Organization (ICAO) vehicle address; data/type code; and parity/interrogator ID. The type code helps identify what information is contained in an ADS-B message. Type codes signifiers are as follows: 1-4 signify aircraft identification; 5-8 signify surface position; 9-18 signify airborne position (w/barometric altitude); 19 signifies airborne velocities; 20-22 signify airborne positions (w/global navigation satellite system height); and 23-31 signify other uses.

During this data conversion, each asset or vehicle 110 within the Local Airport Surface Network is assigned a 24-bit ICAO identification and vehicle identification code to uniquely identify it within the Global ADS-B Network 200. In one embodiment, the Global ADS-B Network 200 comprises an Aireon network with at least an Aireon Satellite Network and an Aireon ground-based Aireon Teleport Network, although it is contemplated that any suitable Global ADS-B Network 200 is contemplated. The FAA, in Advisory Circular No. 15/5220-26, has allocated a block of 200 ICAO identification codes for assets or vehicles 110 to enforce a limit of 200 ground vehicle ADS-B devices per airport. However, the maximum number of assets or vehicles 110 that can be incorporated into the single ADS-B data stream of a single ADS-B device in the system 10 is only limited by FAA regulation on the number of ICAO identification codes allowable per airport. Any number of vehicles or assets 110 can be incorporated into the ADS-B data stream.

The data processor 180 is further connected to an ADS-B broadcaster 250. The data processor 180 sends the combined ADS-B data stream to the ADS-B broadcaster 250. In one embodiment, the data processor 180 is connected to a single ADS-B broadcaster 250 that is connected to both an ADS-B satellite network and an ADS-B ground-based telecommunication network. In another embodiment, the data processor 180 is connected to a first ADS-B broadcaster 250 connected to an ADS-B satellite network and the data processor 180 is further connected to a second ADS-B broadcaster 250 connected to an ADS-B ground-based telecommunication network. The data processor 180 is connected to any number of ADS-B broadcasters 250 consistent with the desired use. The data processor 180 is connected to the ADS-B broadcaster 250 via a cable network, a cellular network, a Wi-Fi network, and/or any other suitable connection means.

The ADS-B satellite network can comprise a plurality of linked satellites 290 in orbit around Earth connected to at least one broadcaster 250. The satellite network allows communications between remote stations/broadcasters 250 by "uplinking" and "downlinking" to at least one of the satellites 290 in the network. The ADS-B ground-based telecommunication network can comprise at least one ADS-B broadcast receiver connected to the ATC. The ADS-B broadcast receiver can comprise an antenna connected to the ADS-B broadcaster 250 via a cable network, a cellular network, a Wi-Fi network, and/or any other suitable connection means.

The ADS-B broadcaster 250 transmits or "broadcasts" the ADS-B data stream received from the Local Airport Surface Processor (LASP). The ADS-B data stream can be transmitted simultaneously to both the ADS-B satellite network and the ADS-B ground-based telecommunication network. In another embodiment, the ADS-B data stream can be sent to either the ADS-B satellite network or the ADS-B ground-based communication and then to the other of ADS-B satellite network or the ADS-B ground-based communication. Any order of transmitting the ADS-B data stream is considered.

The purpose of transmitting the ADS-B data stream is for disseminating the airport vehicle positional data to airports, aircraft and other users across the local airport and across the globe. U.S. Pat. No. 7,961,136 presents an example embodiment of receiving and processing ADS-B data. The '136 patent is hereby incorporated herein by reference. It is contemplated that any method of receiving and processing the ADS-B data stream consistent with the desired use is hereby contemplated. For example, a user at a remote location can connect to the ADS-B satellite network by "downlinking" at an ADS-B receiver. This will allow a user to monitor the converted information for an asset or vehicle 110 at a select airport. For example, a user in New York with an ownership interest in certain assets or vehicles 110 at the Hartsfield-Jackson Atlanta International airport can monitor the location and use of their assets or vehicles 110. In another embodiment, an airplane can be outfitted with an "ADS-B In" receiver allowing the airplane to access the ADS-B satellite network and determine the location of assets or vehicles 110 at a select airport before attempting to land at that airport. The "ADS-B In" receiver in the airplane enables pilots to see the asset's location on in-cockpit moving maps. It is further contemplated that regardless of whether the data is transmitted via an ADS-B satellite network and an ADS-B ground-based telecommunication network, the data processor 180 or other computer receiving data therefrom can be configured to display the location of some or all of the tracked assets or vehicles 110 upon a map, either in real time, at fixed time intervals, or in a time-delayed manner via aggregated data. In one example, the map could be a detailed map of the airport that shows the location of the vehicles or assets 110. In another example, the map could be a geographic map of a city, country, or world showing the vehicles or assets 110 across a wide area.

The system and method is further configured to enable the comparison of information received from the base receiver 150 and other vehicle positional data sources to determine any inconsistencies. In an embodiment where the base receiver 150 receives at least two discreet sources of location information for a given asset, the data processor 180 can be further configured to compare that location information. The data processor 180 could be configured to identify and alert to a user of any inconsistencies between the location data sources. For example, if a "Here I Am" signal places the asset or vehicle 110 at location X and a "There You Are" signal for the same time places the asset or vehicle 110 at location Y, the data processor 180 would identify the discrepancy and flag the asset or vehicle 110 for further interrogation, analysis or reporting. The comparison of positional information from discreet sources can be done by any method or means consistent with the desired use.

It is further contemplated that the information in the ADS-B data stream can be compared to the SMR data to check for differences between the data. Identified anomalies may be indicative of technical problems with the trackers, security risks, issues in transference of the data, and/or another possible issue. In one embodiment, the data processor 180 also collects the SMR data and after converting the information from the base receiver 150 to the ADS-B data format compares the ADS-B data and the SMR data for inconsistencies. In another embodiment, the data processor 180 collects the SMR data and compares it directly to the information from the base receiver 150. In a yet further embodiment, a user and/or program at the ATC collects SMR data and is connected to the ADS-B ground-based telecommunications network to collect the ADS-B data stream to compare the SMR data and the ADS-B data stream. Any method of comparing the collected data is considered that is consistent with the purpose described.

The following documents are hereby incorporated herein, in their entirety, by reference: "FAA-E-3032, Airport Ground Vehicle ADS-B Specification" and "FAA Advisory Circular, 150/5220-26, Airport Ground Vehicle Automatic Dependent Surveillance-Broadcast (ADS-B) Out Squitter Equipment."

What is claimed is:

1. A method for tracking, processing and integrating data from a plurality of vehicles in an airport environment, the method including steps of:
   collecting data from the plurality of vehicles using a non-ADS-B network, wherein the data includes positional data of each of the plurality of vehicles;
   aggregating the data from each of the plurality of vehicles into a single combined data stream having an ADS-B data format; and
   transmitting the combined data stream to an ADS-B network.

2. The method of claim 1, wherein the positional data for the plurality of vehicles is transmitted to the ADS-B network using a single ADS-B transponder.

3. The method of claim 2, wherein the data collected from the plurality of vehicles is collected using at least one of a GPS-enabled device, a "here-I-am" system or a "there-you-are" system.

4. The method of claim 3, wherein the "there-you-are" system collects the positional data of the plurality of vehicles and transmits the data to a data processor.

5. The method of claim 3, wherein the data collected is disseminated locally or globally using the ADS-B network.

6. The method of claim 1, wherein the step of aggregating the data is implemented by a data processor.

7. The method of claim 1, wherein the step of transmitting the single combined data stream is implemented by an ADS-B broadcaster.

8. The method of claim 1, wherein each of the plurality of vehicles is a ground vehicle.

9. The method of claim 1, wherein the step of aggregating data includes:
   converting the data from each of the plurality of vehicles into a plurality of separate data packets, each data packet having a compatible ADS-B data protocol; and
   combining the plurality of separate data packets into the single combined ADS-B data stream.

10. The method of claim 1, wherein the step of collecting date from the plurality of vehicles includes using non-ADS-B transponders.

\* \* \* \* \*